United States Patent
Butler et al.

(10) Patent No.: US 8,589,661 B2
(45) Date of Patent: Nov. 19, 2013

(54) ODD AND EVEN START BIT VECTORS

(75) Inventors: Mike Butler, San Jose, CA (US);
Donald A. Priore, Groton, MA (US);
Steven Beigelmacher, Somerville, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 427 days.

(21) Appl. No.: 12/962,113

(22) Filed: Dec. 7, 2010

(65) Prior Publication Data

US 2012/0144168 A1    Jun. 7, 2012

(51) Int. Cl.
*G06F 9/30* (2006.01)

(52) U.S. Cl.
USPC ........................................................... 712/210

(58) Field of Classification Search
USPC ......................................... 712/210, 204, 213
See application file for complete search history.

(56) References Cited

U.S. PATENT DOCUMENTS

| | | | | |
|---|---|---|---|---|
| 5,450,605 A | * | 9/1995 | Grochowski et al. | 712/23 |
| 5,488,710 A | * | 1/1996 | Sato et al. | 711/125 |
| 5,513,330 A | * | 4/1996 | Stiles | 712/204 |
| 5,586,276 A | * | 12/1996 | Grochowski et al. | 712/204 |
| 5,758,116 A | * | 5/1998 | Lee et al. | 712/210 |
| 5,796,973 A | * | 8/1998 | Witt et al. | 712/208 |
| 5,819,059 A | * | 10/1998 | Tran | 712/213 |
| 5,852,727 A | * | 12/1998 | Narayan et al. | 712/215 |
| 5,880,978 A | * | 3/1999 | Panwar et al. | 708/211 |
| 6,032,250 A | * | 2/2000 | Zaidi | 712/210 |
| 6,308,257 B1 | * | 10/2001 | Theogarajan et al. | 712/210 |
| 6,513,053 B1 | * | 1/2003 | Hill | 708/210 |
| 6,862,563 B1 | * | 3/2005 | Hakewill et al. | 703/14 |
| 2012/0143874 A1 | * | 6/2012 | Kenney | 707/745 |

* cited by examiner

*Primary Examiner* — Keith Vicary
(74) *Attorney, Agent, or Firm* — Volpe and Koenig, P.C.

(57) ABSTRACT

A method and apparatus are presented for processing a stream of information, including preprocessing the stream, which includes partitioning the stream into packets of interest; determining boundaries for the packets of interest, wherein a packet boundary is either a start location or an end location for a packet; and making a record of the packet boundaries by setting a hint bit in a hint bit vector, a location of the hint bit within the hint bit vector corresponding to a position of the packet in the stream. The hint bit vector is split into two or more vectors, where the hint bits are assigned to one of the vectors on an alternating basis. The packets of interest are processed corresponding to the hint bits assigned to each vector in parallel over multiple clock cycles, wherein an original order of the packets of interest is maintained in the stream.

13 Claims, 5 Drawing Sheets

ODD AND EVEN START BIT VECTORS

FIELD OF INVENTION

This application is related to processing data.

BACKGROUND

As processors evolve, emphasis is increasingly placed on processor performance. In order to achieve faster performance, technological advances are being pursued with respect to both the scale of the processors as well as with more efficient completion of computing tasks.

In order for a processor to operate at a high frequency and a low power, efficient processing of information is critical. A sequence of instructions (i.e., an instruction stream) may be used by a processor, for example an X86 processor, to process information. Prior to decoding instructions, the start location of each instruction must be determined. Since the X86 architecture is a variable length instruction architecture, a large amount of resources are used to determine the start locations of instructions within an instruction stream. Once the instruction start locations are determined, they are used by the machine to more efficiently process information.

An instruction stream may be fed to a unit, such as a decode unit, that picks instructions from the stream and sends the instructions to other areas of the machine for execution. The identification of the byte length of each instruction, so that the start locations of the subsequent instructions may be determined, is a complex task. Thus, it is not efficient for the machine to re-process the instruction stream to determine the instruction lengths prior to picking instructions during subsequent iterations of the program. By storing the start locations of instructions within the instruction stream, the processing of subsequent iterations is more efficient.

Consequently, processors are routinely built to identify the start location of each instruction only once and store this information for use during subsequent iterations. Accordingly, it would be beneficial to provide a method and apparatus capable of making use of this information most efficiently while processing an instruction stream at a high frequency.

SUMMARY OF EMBODIMENTS

A method and apparatus is presented for identifying instruction start locations in a stream of information by preprocessing the stream of information, storing the instruction start locations in a vector and decomposing the vector into two or more vectors that may be processed in parallel are included in the embodiments disclosed. In an embodiment, a processor is configured to partition a stream of information into packets of interest, make a record of packet boundaries for the packets of interest and split the record of packet boundaries into two or more vectors where the packets of interest are assigned to the vectors on an alternating basis. The processor uses a plurality of vectors to process the packets of interest in parallel over multiple clock cycles.

DETAILED DESCRIPTION OF THE EMBODIMENTS

In order to enable a machine, such as a processor, to run at a high frequency and a low power, efficient processing of information is important. While the processing of instruction streams is described in more detail herein, other forms of information may be processed more efficiently including but are not limited to graphics and data packets. The herein approach may apply to any situation where it is desirable to find the first "n" occurrences in a set of information.

Figure 1:
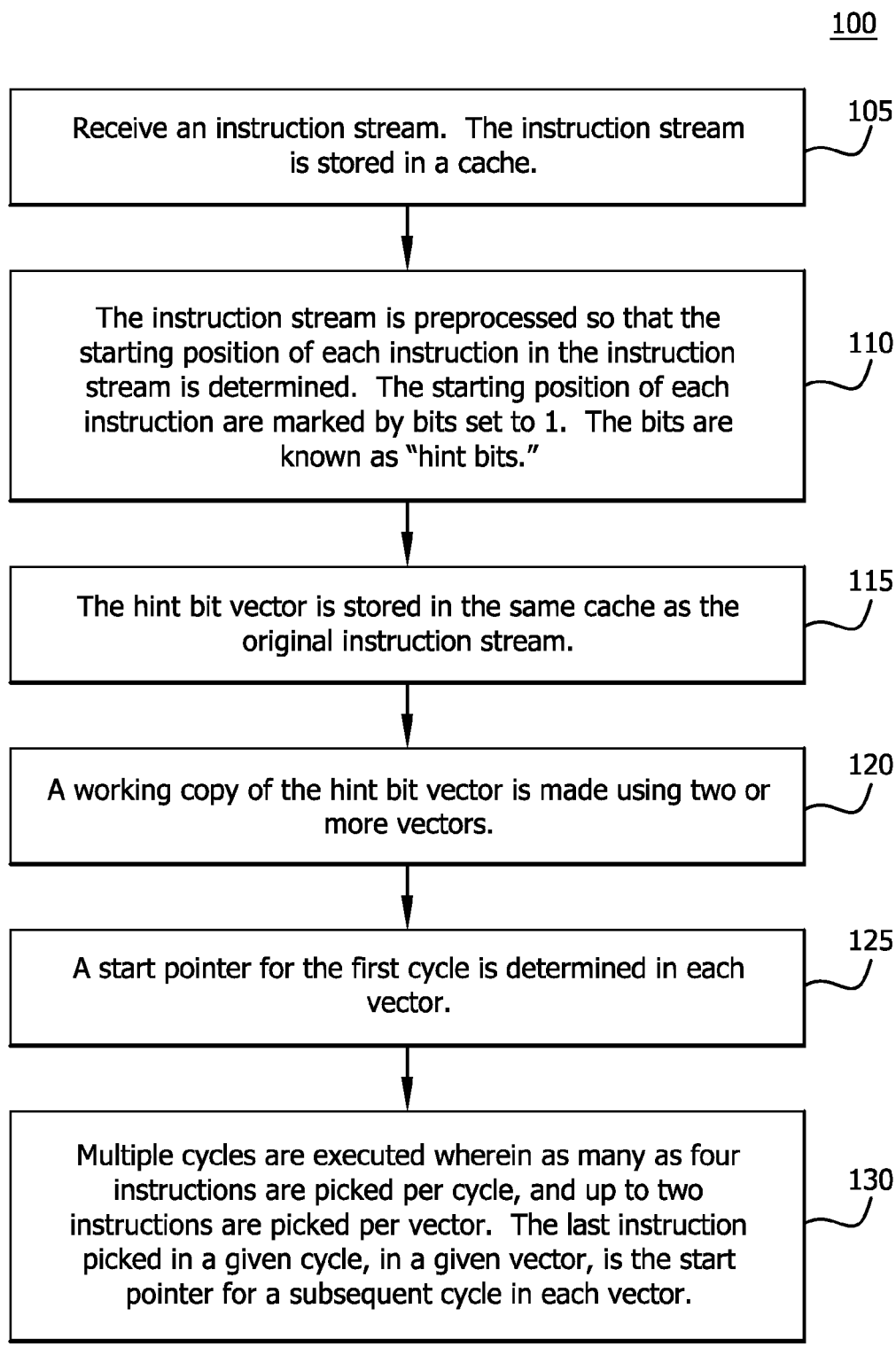
FIG. 1 is a high level flow diagram of processing an instruction stream using multiple vectors.
Figure 4:
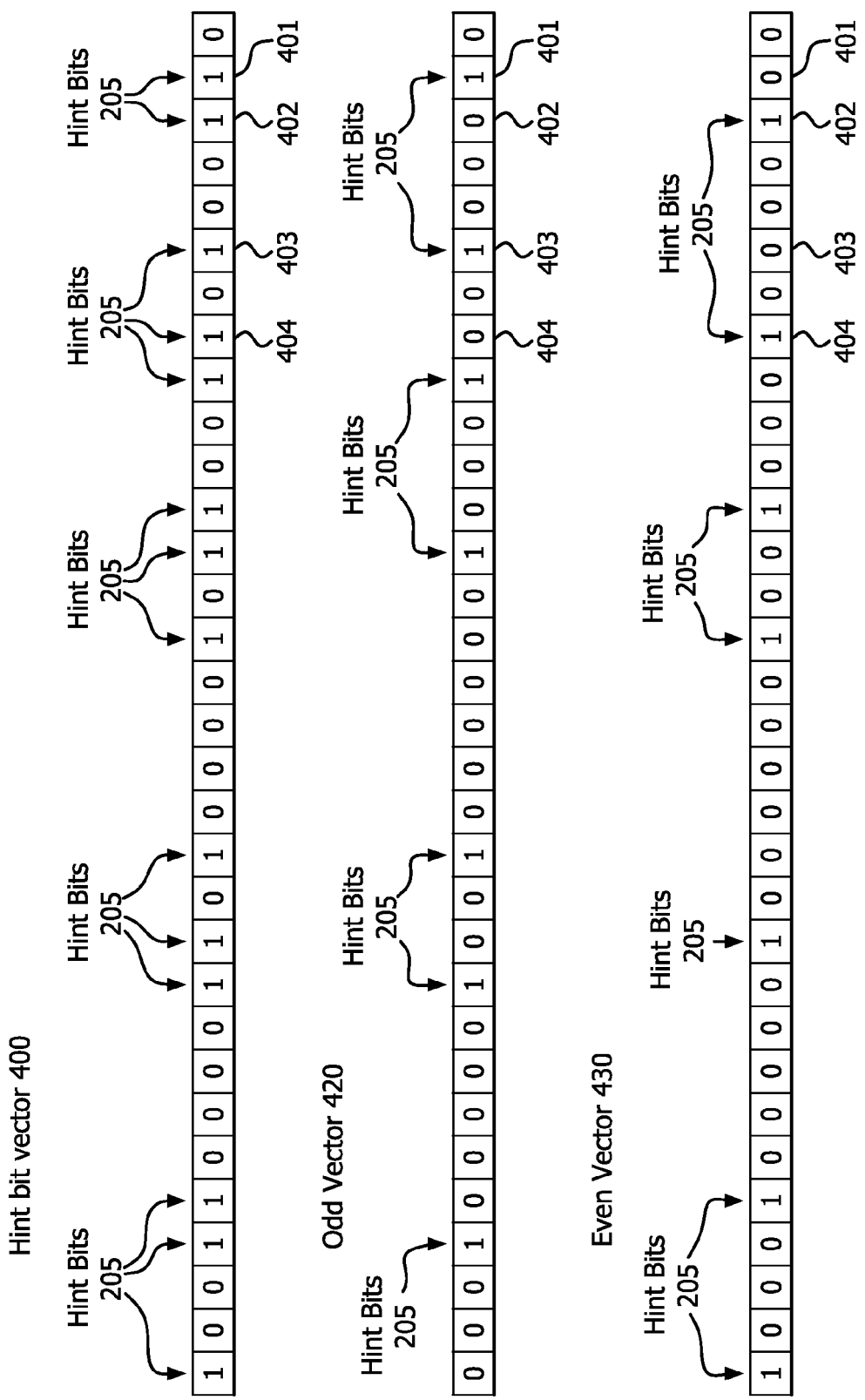
FIG. 4 is an example of a functional block diagram of the hint bit vector decomposed into multiple vectors.
Figure 5:
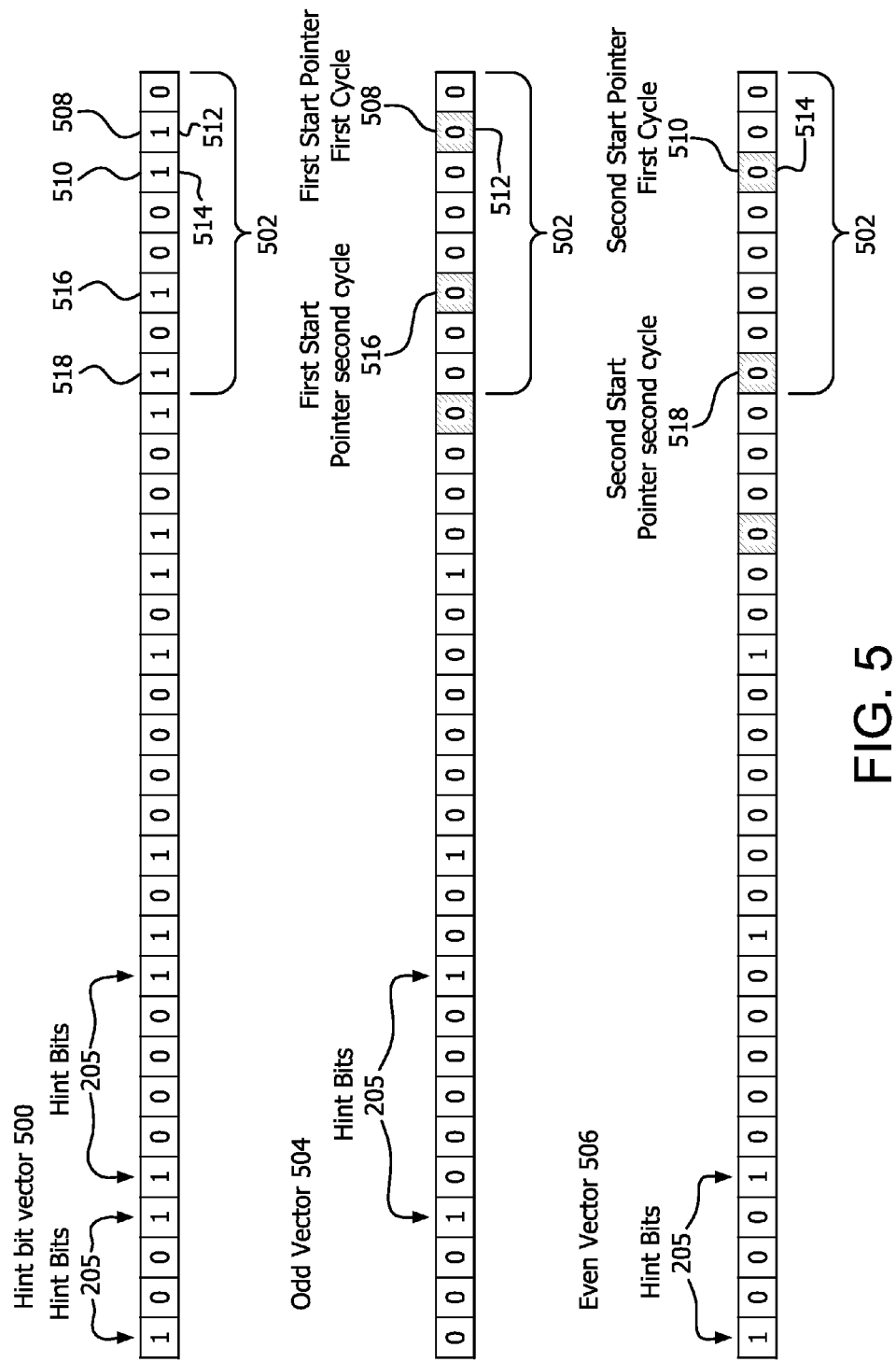
FIG. 5 is an example of a functional block diagram of the hint bit vector decomposed into multiple vectors, at the end of a first clock cycle.

FIG. 1 is a high level flow diagram 100 of decomposing a bit vector into two or more component vectors that may be processed in parallel; this process is further defined in FIGS. 4 and 5. An instruction stream may be received by the decode unit in chunks of fixed size, such as 32 bytes, and each byte consists of eight bits (i.e., 0s and 1s). The instruction stream may be stored in a cache prior to processing and may be read from the cache during each subsequent execution of the instruction stream (step 105).

The instruction stream is preprocessed so that the starting position of each instruction in the instruction stream may be determined. The starting positions of instructions in the instruction stream are marked by bits set to "1", while the bit "0" indicates that no instruction begins at that particular location (step 110). By preprocessing the instruction stream, a bit vector, which includes the starting position of each instruction in the original instruction stream, is determined. For example, a 32 bit vector may be determined for each 32 byte chunk of the instruction stream, with each bit set to 1 if its corresponding instruction byte constitutes the first byte of an instruction and set to 0 otherwise.

In one embodiment, the bit vector may identify the starting locations of each instruction in the instruction stream. In another embodiment, the bit vector may identify the end locations of each instruction in the instruction stream. Each instruction in the original instruction stream may be referred to as a "packet of interest." Instructions may begin or end on any "packet boundary". A packet boundary may refer to either a start location or an end location of an instruction. A record of each packet boundary may be made and stored in a cache.

A starting location of an instruction may be indicated by a "hint bit" and the bit vector may be referred to as a hint bit vector. The hint bit vector, once identified, may be stored in the same cache as the instruction stream (step 115) so that in subsequent iterations of the instruction stream the hint bit vector is also used.

The hint bits enable the machine to efficiently identify the start location of each instruction within the instruction stream. Since the hint bits are used in subsequent executions of the instruction stream to identify start locations of instructions, the hint bits negate the need to re-calculate the instruction locations prior to picking them from the instruction stream.

Each time the instruction stream is executed, both the instruction stream and the hint bit vector are first read from the cache. After preprocessing the instruction stream to identify the hint bits, processing of the instruction stream during subsequent executions is less time intensive since the hint bits are already identified.

A working copy of the hint bit vector is made using two or more vectors (i.e., an odd vector and an even vector) each time the instruction stream is executed (step 120). The hint bit vector is divided into the two or more vectors to execute one loop of the instruction stream. The use of two or more vectors enables a machine to process information at a high frequency by processing the vectors in parallel over multiple clock cycles.

One loop of the instruction stream is executed over multiple clock cycles using the two or more vectors. The hint bits from the hint bit vector are allocated to either the odd or the even vectors on an alternating basis. For example, the first hint bit may be allocated to the odd vector while the second hint bit may be allocated to the even vector, and so forth. The alternating of hint bits between odd and even vectors enables a machine to pick instructions in parallel, which results in a higher frequency picking process because fewer hint bits need be found from any one vector in a single clock cycle.

While the hint bits in the hint bit vector do not change from one execution of the instruction stream to another, the working copy of the hint bit vector does change. As each instruction is picked from the working copy, the hint bits are nulled. By nulling the hint bits, the machine is able to move to the next instruction in a sequence. However, the cached version of the hint bit vector, which is used in subsequent loop executions of the instruction stream, remains unchanged.

Any byte location within an instruction stream may be designated by an instruction as a new start location for subsequent processing. The new start location itself is considered a "start pointer" for a first clock cycle of subsequent processing in the first vector (step 125). The start pointer refers to the location of the starting position for each clock cycle. Once the start pointer is determined, hint bits may be identified one-by-one in the hint bit vector by performing a find action, further defined with respect to FIGS. 3 and 5.

Multiple clock cycles may be executed, wherein up to four instructions are picked per clock cycle, and up to two instructions are picked per vector during the cycle. The last instruction picked in a given clock cycle, in a given vector, is used as the start pointer for a subsequent clock cycle in each vector (step 130). Using multiple vectors per cycle, in contrast to using one vector per cycle, to pick as many as four instructions during the cycle, enables a machine to more easily pick at a high frequency.

The hint bits in the odd vector and the even vector are identified one-by-one in a clock cycle. While multiple vectors, start pointers and clock cycles may be utilized in one execution of the instruction stream, the instruction stream and hint bit vector remain unchanged. For each execution of the instruction stream, the instruction stream and the hint bit vector are read from the cache.

Figure 2:
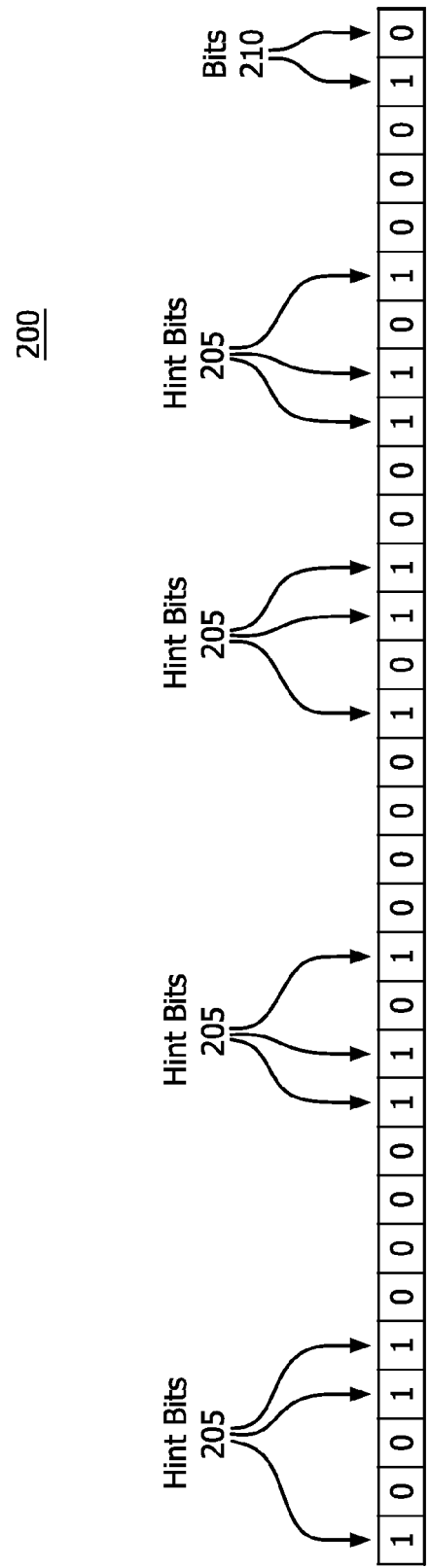
FIG. 2 is an example functional block diagram of a hint bit vector.

FIG. 2 is an example of a functional block diagram of a hint bit vector 200 comprising a plurality of bits 210. When an instruction stream is received, the information in the instruction stream shows no discernible means by which to readily and efficiently identify the start of an instruction. Preprocessing the instruction stream to create a hint bit vector allows for the identification of the location of the start of instruction information.

The hint bit vector 200 is made up of binary data (i.e., 0s and 1s). The is in the hint bit vector 200 are designated hint bits 205 and correspond to the start location of instructions within the original data stream. The 0s in the hint bit vector 200 (not labeled for ease of understanding) do not correspond to start locations.

A hint bit 205 is used to identify an actual byte location of where an instruction starts in the instruction stream. In general, the apparatus (e.g., a processor), is configured to determine the start of an instruction in an instruction stream by associating each byte of instruction information with a hint bit 205. Once hint bits 205 are identified and located, they are stored in the hint bit vector 200, which may also be referred to as a start bit vector, in the same cache as the instruction stream. This hint bit vector 200 is thereafter used by the apparatus to locate instructions in subsequent executions or loops of the instruction stream. The hint bit vector 200 is read from right to left as shown in FIG. 3.

Figure 3:
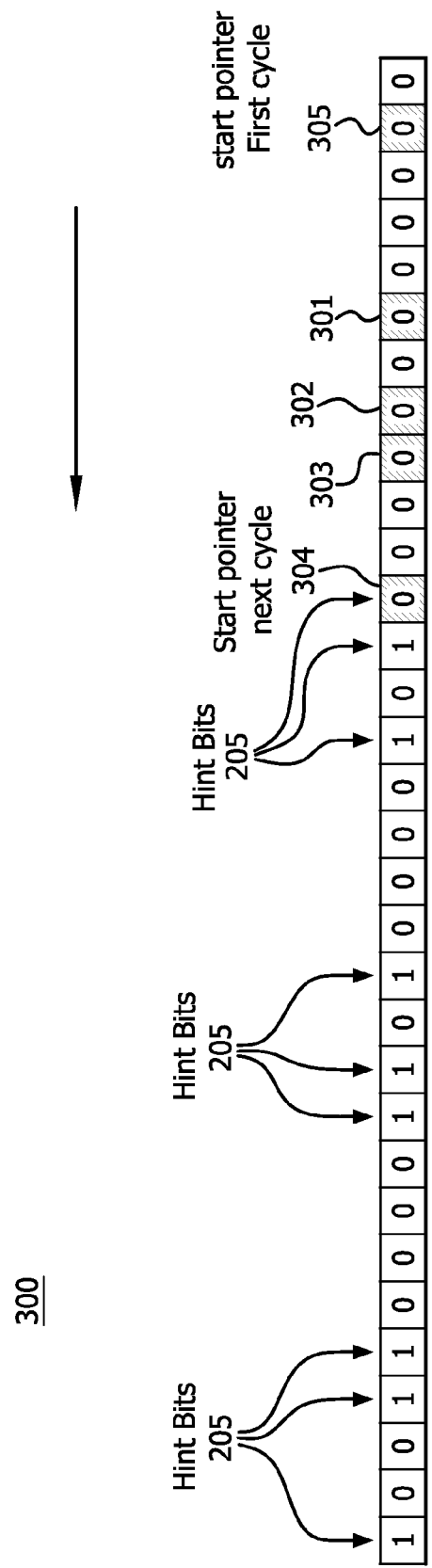
FIG. 3 is an example functional block diagram of a working copy of the hint bit vector, at the end of a first cycle.

FIG. 3 shows an example of the working copy of the hint bit vector 300 at the end of a first clock cycle. The start location (i.e., start pointer) 305 for the cycle may coincide with the first hint bit in the instruction stream. A start pointer is needed for each cycle and is determined at the beginning of each cycle. Once the start pointer is determined the start location of the cycle is known. All hint bits up to and including the start pointer 305 may be nulled (i.e., set to 0s, thus converting the hint bits 205 to non-hint bits). The working copy of the hint bit vector 300 is processed by picking as many as four instructions per clock cycle, from the right to the left.

Once the location of a hint bit is determined, it is read and masked out by a change to the binary data, for example, by changing the binary 1 to 0. In FIG. 3, four hint bits are located one-by-one and masked once the instruction is picked in the clock cycle. To find the first hint bit 301 after the start pointer 305, a "find first" action is executed. When the first hint bit 301 is located, it is used to determine the locations of the hint bits 302-304 that may be picked in the first clock cycle.

In order to find the second hint bit 302 a "find second" action is performed. The third hint bit 303 and fourth hint 304 bit in a given clock cycle are also determined by a "find third" action and "find fourth" action, respectively. When the fourth hint bit 304 is determined, it is used as the start pointer for the next clock cycle. All hint bits 301, 302, 303 and 304, once picked in the clock cycle, are nulled. To ensure that multiple clock cycles of execution of the hint bit vector are accomplished in an efficient manner, and that a subsequent cycle begins where a prior clock cycle left off, the last hint bit of a clock cycle is used as the start pointer for the subsequent clock cycle. In FIG. 3, the start pointer for a subsequent cycle is the last picked hint bit 304.

Relative to the flow diagram of FIG. 1, FIG. 4 is an example of a functional block diagram of the hint bit vector 400 decomposed into multiple vectors 420, 430.

The hint bit vector 400 may be split into a plurality vectors. For example, two vectors may be created where one vector is an "odd" vector 420 and the other vector is an "even" vector 430. The first hint bit 401, located in the hint bit vector 400, corresponds to the first instruction in the odd vector 420. The bit location in the even vector 430, corresponding to the first hint bit 401 in the odd vector 420, is depicted with a 0, indicating that there is no instruction in the even vector 430 at this bit location. The second hint bit 402 located in hint bit vector 400, corresponds to the first instruction in even vector 430. The bit location in the odd vector 420, corresponding to the first hint bit 402 in the even vector 430, is depicted with a 0, indicating that there is no instruction in the odd vector 420 at this position.

Every hint bit in the hint bit vector 400 is located in either the odd vector 420 or the even vector 430, but not in both. The hint bits in hint bit vector 400 alternate between the odd vector 420 and the even vector 430 so that the odd vector 420 receives the first hint bit 401, the even vector 430 receives the second hint bit 402, the odd vector 420 receives the third hint bit 403, the even vector 430 receives the fourth hint bit 404, and so on. The number of hint bits may vary per vector.

Relative to the flow diagram of FIG. 1, FIG. 5 is an example of a functional block diagram of a hint bit vector 500 which is broken into multiple vectors, as modified after one clock cycle 502. The hint bit vector 500 is split into an odd vector 504 and an even vector 506. A start location 508, 510 is determined, respectively, for each vector 504, 506.

Odd vector 504 is the first to receive an instruction from the hint bit vector 500 and contains the first start pointer 508 for the first cycle. Even vector 506 is the second vector to receive an instruction from the hint bit vector 500 and contains the second start pointer 510 for the first cycle, and so forth for each additional vector that may be used to execute one loop of an instruction stream. Each vector 504, 506 is then executed by picking one or more instructions per clock cycle from right to left in each vector.

In the embodiment of FIG. 5, as many as four hint bits are located one-by-one in the first clock cycle 502 using both the odd vector 504 and the even vector 506. Each hint bit is masked (i.e., nulled) once the instruction is picked in the first clock cycle. To find a first hint bit 512 after the first start pointer 508 in the odd vector 504, a "find first" action is executed. To find a second hint bit 514 after the second start pointer 510 in the even vector 506 a "find first" action is executed. A third hint bit 516 is found by performing a "find second" action in the odd vector 504. A fourth hint bit 518 is found by performing a "find second" action in the even vector 506. When the location of a hint bit is determined, it is read and masked by changing the binary 1 to a 0.

When the final hint bit in a clock cycle in each vector is determined, it is used as the start pointer for the vector in the next clock cycle. To ensure that multiple clock cycles of execution of the hint bit vector 500 are accomplished in an efficient manner, and that the next clock cycle begins where the previous clock cycle left off, the final hint bit in a vector at the end of the previous clock cycle is used as the start pointer for the vector in the next clock cycle.

After the hint bits 512-518 in the first clock cycle 502 are identified and picked, the last hint bit identified in each vector in each cycle is the start pointer for the next cycle. For example, the hint bit 516 for the odd vector 504 and the hint bit 518 for the even vector 506 are the start pointers for the next clock cycle. Once the start pointers for the next clock cycle for each vector are determined, one of the start pointers is determined to be a first start pointer for a subsequent clock cycle and one of the start pointers is determined to be a second start pointer based on the relative positions of the pointers.

The number of instructions picked per clock cycle may vary. For example, in a given clock cycle up to four instructions may be picked, wherein up to two instructions are picked from each vector. However, it may not be possible to pick four instructions in a given clock cycle. For example, two instructions may be picked from the odd vector while only one instruction is picked from the even vector. Since instructions may be anywhere from one to fifteen bytes long, there may not be four hint bits in a working copy of the hint bit vector in a given cycle to pick. When fewer than two instructions are picked in a cycle in a vector, the next cycles start pointer may not be the second instruction picked in a cycle in a given vector but may be the first instruction picked in a given cycle in a given vector. In the above example the start pointer for the next cycle in the odd vector would be the second instruction picked while the start pointer in the even vector for the next cycle would be the first instruction picked.

When this occurs, a first start pointer may be located in a different vector than the vector in which it was located in during a previous clock cycle. In the above example, the even vector, where only one instruction was picked in the current cycle, would include the first start pointer for the next cycle. The odd vector, where two instructions were picked in the current cycle, would include the second start pointer for the next cycle. The location of the first start pointer is monitored so that the instructions picked may then be reordered, if necessary, before the instructions are sent to other areas of the machine. This enables the vectors to work in parallel and the instructions to remain in order.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data, (e.g., netlists, GDS data, or the like), that may be used to perform a manufacturing process implemented in a semiconductor fabrication facility. The manufacturing process may be adapted to manufacture semiconductor devices (e.g., processors) that embody various aspects of the present invention.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the present invention.

Processors may be any one of a variety of processors such as a central processing unit (CPU) or a graphics processing unit (GPU). For instance, they may be x86 microprocessors that implement x86 64-bit instruction set architecture and are used in desktops, laptops, servers, and superscalar computers, or they may be Advanced RISC (Reduced Instruction Set Computer) Machines (ARM) processors that are used in mobile phones or digital media players. Other embodiments of the processors are contemplated, such as Digital Signal Processors (DSP) that are particularly useful in the processing and implementation of algorithms related to digital signals, such as voice data and communication signals, and microcontrollers that are useful in consumer applications, such as printers and copy machines. Although the embodiment may include one processor for illustrative purposes, any other number of processors will be in-line with the described embodiments.

What is claimed is:

1. A method for processing a stream of information, comprising:
    preprocessing the stream of information, wherein the preprocessing includes:
        partitioning the stream of information into packets of interest;
        determining boundaries for the packets of interest, wherein a packet boundary is either a start location for a packet in the stream of information or an end location for a packet in the stream of information; and
        making a record of the packet boundaries by setting a hint bit in a hint bit vector, a location of the hint bit within the hint bit vector corresponding to a position of the packet in the stream of information;
    splitting the hint bit vector into two or more vectors, where the hint bits are assigned to one of the two or more vectors on an alternating basis;
    processing the packets of interest corresponding to the hint bits assigned to each vector in parallel over multiple clock cycles; and
    wherein an original order of the packets of interest is maintained in the stream of information.

2. The method of claim 1, wherein a first unprocessed packet of interest as indicated by a corresponding hint bit in the hint bit vector during a clock cycle is a first processed packet of interest in a subsequent clock cycle.

3. The method of claim 1, wherein a number of the packets of interest processed varies in each clock cycle.

4. The method of claim 1, wherein a working copy of the hint bit vector is created.

5. The method of claim 4, wherein in the working copy of the hint bit vector, the hint bits corresponding to the packets processed in a clock cycle are nulled in a subsequent clock cycle by setting those hint bits to zero.

6. An apparatus for processing a stream of information, comprising:
    a hardware processor configured to:
        partition the stream of information into packets of interest;
        make a record of packet boundaries for the packets of interest by setting a hint bit in a hint bit vector, a location of the hint bit within the hint bit vector corresponding to a position of the packet in the stream of information, wherein a packet boundary is either a start location for a packet in the stream of information or an end location for a packet in the stream of information; and
        split the hint bit vector into two or more vectors where the hint bits are assigned to one of the two or more vectors on an alternating basis;
    wherein the hardware processor uses a plurality of hint bit vectors to process the packets of interest corresponding to the hint bits in parallel over multiple clock cycles; and
    wherein the hardware processor maintains an original order of the packets of interest in the stream of information.

7. The apparatus of claim 6, wherein a first unprocessed packet of interest as indicated by a corresponding hint bit in the hint bit vector during a clock cycle is a first processed packet of interest in a subsequent clock cycle.

8. The apparatus of claim 6, wherein a working copy of the hint bit vector is created.

9. The apparatus of claim 8, wherein in the working copy of the hint bit vector, the hint bits corresponding to the packets processed in a clock cycle are nulled in a subsequent clock cycle by setting those hint bits to zero.

10. The apparatus of claim 6, wherein a number of the packets of interest processed varies in each clock cycle.

11. A non-transitory computer-readable storage medium storing a set of instructions for execution by one or more processors to process a stream of information, the set of instructions comprising:
    a preprocessing code segment for preprocessing the stream of information, wherein the preprocessing code segment includes:
        a partitioning code segment for partitioning the stream of information into packets of interest;
        a determining code segment for determining boundaries for packets of interest, wherein a packet boundary is either a start location for a packet in the stream of information or an end location for a packet in the stream of information; and
        a making code segment for making a record of the packet boundaries by setting a hint bit in a hint bit vector, a location of the hint bit within the hint bit vector corresponding to a position of the packet in the stream of information;
    a splitting code segment for splitting the hint bit vector into two or more vectors where the hint bits are assigned to one of the two or more vectors on an alternating basis; and
    a processing code segment for processing the packets of interest corresponding to the hint bits assigned to each vector in parallel over multiple clock cycles, wherein an original order of the packets of interest is maintained in the stream of information.

12. The non-transitory computer-readable storage medium of claim 11, wherein the instructions are Verilog data instructions.

13. The non-transitory computer-readable storage medium of claim 11, wherein the instructions are hardware description language (HDL) instructions.

* * * * *